US009454201B2

(12) United States Patent
Thevar

(10) Patent No.: US 9,454,201 B2
(45) Date of Patent: Sep. 27, 2016

(54) DETECTING ACCESS TO POWERED DOWN DEVICE

(71) Applicant: Intel Corporation, Santa Clara, CA (US)

(72) Inventor: Balakesan Ponniah Thevar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 13/729,682

(22) Filed: Dec. 28, 2012

(65) Prior Publication Data

US 2013/0262903 A1 Oct. 3, 2013

(30) Foreign Application Priority Data

Mar. 30, 2012 (IN) .............................. 977/DEL/2012

(51) Int. Cl.
G06F 11/30 (2006.01)
G06F 1/30 (2006.01)
G06F 1/32 (2006.01)

(52) U.S. Cl.
CPC .............. *G06F 1/30* (2013.01); *G06F 1/3225* (2013.01); *G06F 1/3275* (2013.01); *Y02B 60/1225* (2013.01); *Y02B 60/1228* (2013.01)

(58) Field of Classification Search
CPC ................................................. G06F 12/0802
USPC .......................... 713/300, 324, 340; 711/118
See application file for complete search history.

(56) References Cited

U.S. PATENT DOCUMENTS

| 5,901,103 | A | * | 5/1999 | Harris et al. .................. 365/226 |
|---|---|---|---|---|
| 6,243,315 | B1 | * | 6/2001 | Goodman ..................... 365/222 |
| 2005/0210206 | A1 | * | 9/2005 | Woodbridge et al. ........ 711/154 |
| 2006/0067153 | A1 | * | 3/2006 | Scheiblhofer et al. .. 365/230.03 |
| 2007/0061525 | A1 | * | 3/2007 | Hildebrand ................... 711/154 |
| 2008/0034234 | A1 | * | 2/2008 | Shimizu et al. .............. 713/320 |
| 2008/0320203 | A1 | * | 12/2008 | Fitzgerald ......................... 711/5 |
| 2009/0172469 | A1 | | 7/2009 | Xiao |
| 2009/0189686 | A1 | * | 7/2009 | Yamada et al. ............... 327/544 |
| 2009/0249106 | A1 | * | 10/2009 | Sajayan et al. ............... 713/324 |
| 2010/0287391 | A1 | * | 11/2010 | Ochiai .......................... 713/320 |

(Continued)

FOREIGN PATENT DOCUMENTS

| CN | 1332863 A | 1/2002 |
|---|---|---|
| CN | 1989478 A | 6/2007 |

(Continued)

OTHER PUBLICATIONS

Office Action received for Chinese Patent Application No. 201310096353.1, mailed on Jun. 19, 2015, 11 pages.

(Continued)

*Primary Examiner* — Vincent Tran
(74) *Attorney, Agent, or Firm* — Alpine Technology Law Group LLC

(57) ABSTRACT

Methods and apparatus relating to detecting access to powered down devices are described. In one embodiment, the power status of a device is determined based on a memory address corresponding to a data access request initiated by a processor or processor core. Access to a storage device, corresponding to the device, is controlled based on the power status of the device, e.g., to avoid random system hanging or crashes that may be hard to reproduce or debug. Other embodiments are also disclosed and claimed.

35 Claims, 4 Drawing Sheets

(56) References Cited

U.S. PATENT DOCUMENTS

2012/0042148 A1* 2/2012 Grunzke .................. 711/211
2013/0326252 A1* 12/2013 Ise ................... G06F 1/3234
                                                    713/323

FOREIGN PATENT DOCUMENTS

| CN | 101187830 A | 5/2008 |
| WO | 00/26753 A1 | 5/2000 |
| WO | 2006/019636 A1 | 2/2006 |

OTHER PUBLICATIONS

Office Action received for Chinese Patent Application No. 201310096353.1, mailed don Feb. 25, 2016, 3 pages.

Office Action received for Chinese Patent Application No. 201310096353.1, mailed on Aug. 1, 2016, 6 pages including 3 pages of English translation.

* cited by examiner

DETECTING ACCESS TO POWERED DOWN DEVICE

RELATED APPLICATIONS

The present application claims priority to Indian patent application no. 977/DEL/2012, filed on Mar. 30, 2012, entitle "Detecting Access to Powered Down Device", which is incorporated herein by reference for all purposes.

FIELD

The present disclosure generally relates to the field of electronics. More particularly, an embodiment of the invention relates to detecting access to a powered down device.

BACKGROUND

As computing systems become more sophisticated, manufacturers are able to add more functionality to a computing system by integrating or attaching additional components to the computing system. Additional components introduce additional signal switching, in turn, generating more heat and consuming additional power. The additional heat generation may damage integrated circuits within the components by, for example, thermal expansion. Also, the additional heat may limit usage locations and/or applications of a computing device that includes such components. For example, a portable computing device that relies on battery power for its operations may suffer from the additional power consumption.

Hence, as additional functionality is added to portable computing devices, the need to reduce power consumption becomes increasingly important, e.g., to maintain battery power for an extended period of time. Non-portable computing systems also face cooling and/or power generation issues as their components use more power and generate more heat.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
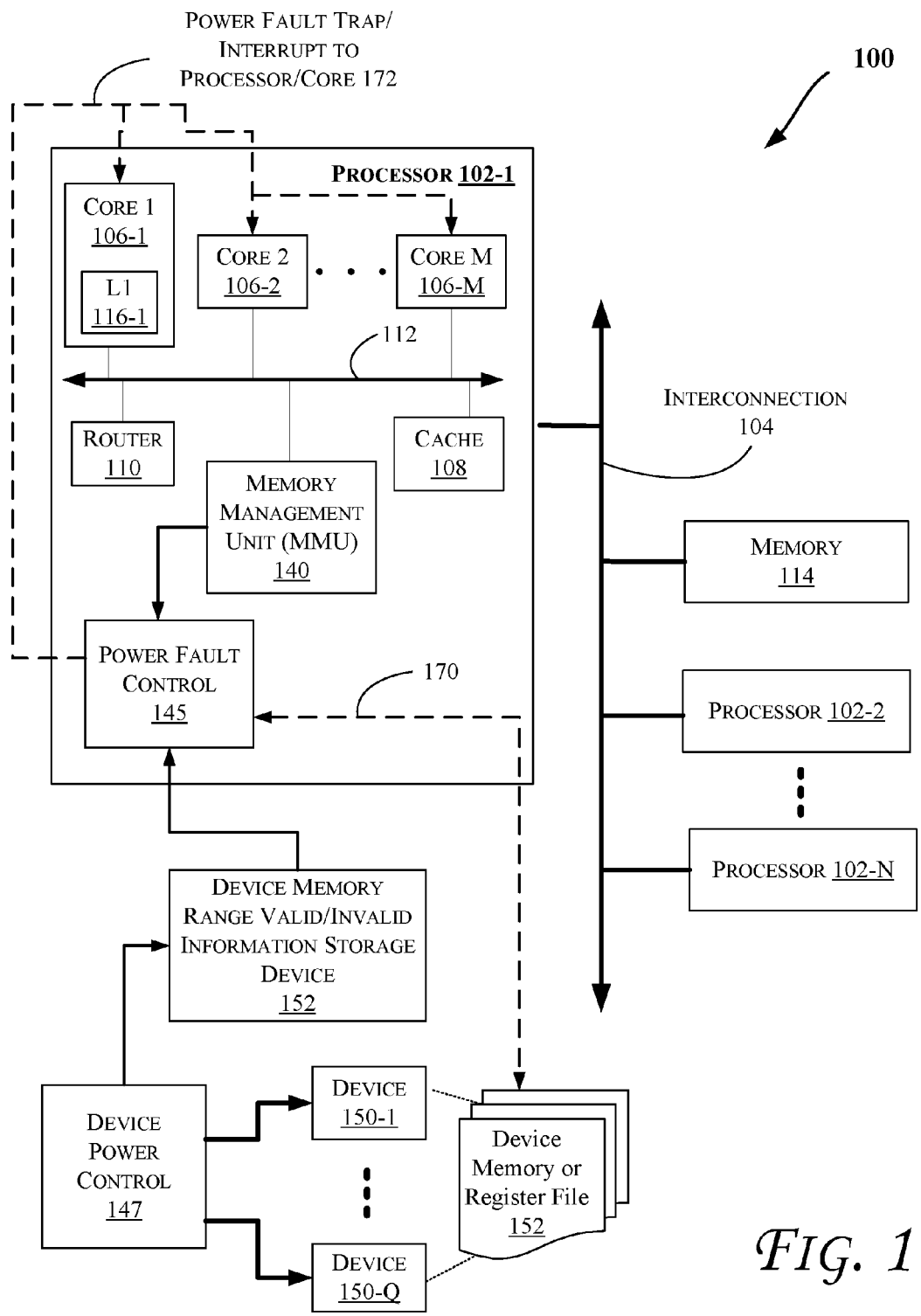
FIGS. 1, 3, and 4 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

In some implementations, hardware may power down some attached components to reduce power consumption and/or reduce heat generation, e.g., when the components are not in use. However, allowing hardware to power down components may cause random system hanging or crashes that may be hard to reproduce or debug.

In some computing platforms, a Power Management Module (PMM) may power down various components such as one or more of the I/O devices, hardware accelerators, etc. when these components are idle (or otherwise not in use or required to be turned on), e.g., by using power gates. Power gates generally refer to controllable switches (that may include one or more power transistors) that control the supply of power to components. This creates a challenge and problems to the software, because the software unknowingly, may attempt to access a component when it is powered down. This may in turn generate random system hangs and/or crashes, which may be hard to reproduce and debug.

Some embodiments allow a system to detect and trap such power-fault failures and inform the software (e.g., Operating System (OS), device driver, etc.) for further handling. For example, a bit (e.g., in a register such as a control register) may be set (e.g., by OS, a user, etc.) to enable/disable the power-fault trap/detection feature for a given device, all devices in a system, or select devices in a system. Other control bits may also be stored in the same storage device or register. In an embodiment, logic (e.g., within a memory system) checks the power status of a device or component before accessing the device and/or device's memory. This fault check technique may be an optional feature and is capable of trapping access to the powered down device and informing the OS, a corresponding device driver, etc., as a power-fault trap event for further handling. This allows the OS and/or the driver to power up the device and continue the operation to maintain data correctness and avoid attempts to access a powered down device or its memory that may result in system hangs, system crashes, etc.

By contrast, current systems do not have the following: (a) a power-fault error detection mechanism (e.g., to check for whether a device is powered down before accessing the device, the device's memory, and/or memory associated with the device); or (b) a power-fault error recovery mechanism (e.g., to inform the OS, driver, etc. regarding an inappropriate/illegal access via an event, an interrupt, etc. to hardware such as a processor for further error-recovery options). Hence, current systems do not have a mechanism to detect such power-fault failure in hardware; instead, the issue needs to be debugged/detected in software. However, using software to check the power status of a device (e.g., for every access) would lead to poor performance.

Moreover, some embodiments may be applied in computing systems that include one or more processors (e.g., with one or more processor cores), such as those discussed with reference to FIGS. 1-4. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 3-4), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

As shown in FIG. 1, the system 100 may also include a memory management unit (MMU) logic 140. The MMU 140 may facilitate access to storage device(s) (such as memory 114 and/or devices 150-1 to 150-Q (also referred to herein as "device 150" or "devices 150" such as any of the peripherals discussed herein, e.g., with reference to FIG. 3 or 4)) by components of the processor 102-1. The devices 150 may include various devices that are attached to the system 100, including for example, Input/Output (I/O) devices, etc. The MMU 140 may be coupled to the cores 106 via the bus or interconnect 112 to communicate data to and from a storage device and/or to receive an address (e.g., a virtual address) associated with some stored data (e.g., in a storage device such as those discussed herein) from the cores 106. In some embodiments, the MMU 140 may translate a received virtual address to a physical address. In an embodiment, the MMU 140 may include a Translation Lookaside Buffer (TLB) to store one or more virtual addresses and their corresponding physical addresses. If the physical address from the MMU 140 is associated with a location within the device memory or register file 152, then the physical address may be sent to the power fault control logic 145. In an embodiment, the determination of whether the physical address from the MMU 140 is associated with a location within the device memory or register file 152 may be performed by the MMU 140 (e.g., based on information stored in a storage device that is accessible by the MMU 140, such as those included in the system 100). Also, instead of having a separate storage device (such as device 152) for the stored information, the information may be stored in other storage devices in the system 100 (such as in one or more of the cache 108, memory 114, etc.).

In some embodiments, the device memory or register file 152 may be included in the corresponding device 150, e.g., on the same integrated circuit (IC) die. Alternatively or in addition to the aforementioned embodiments, the device memory or register file 152 may be stored in a corresponding memory device that is communicatively coupled to the devices 150. For example, the device memory or register file 152 may be implemented as Memory Mapped Input/Output (MMIO) device and/or Port Mapped Input/Output (PMIO) device.

Generally, memory-mapped I/O may be used to address both memory (e.g., memory 114) and Input/Output (I/O) devices (such as devices 150). For example, the memory and/or registers of the I/O devices are mapped to (or associated with) address values accessed by a processor. In some implementations, some address ranges are reserved for I/O and are unavailable for other memory operations.

Additionally, PMIO may be used with some special instructions specifically for performing I/O operations. For example, in at least one instruction set architecture, such instructions may read and write one to four bytes to and from an I/O device. Also, the I/O devices (e.g., devices 150) may have a separate address space from general memory (e.g., memory 114), for example, via an extra "I/O" pin on the physical interface or an entire bus or interconnect dedicated to I/O.

As shown in FIG. 1, a device power control logic 147 (e.g., including power gates) may control the supply of power to one or more of the devices 150, e.g., based on a signal or indication from a Power Management Module (PMM) which may be provided in various components of the system 100, including for example the processor 102-1 (not shown). Power gates generally refer to controllable switches (that may include one or more power transistors) that control the supply of power to components. Hence, the device power control logic 147 may power down one or more of the devices 150 when the devices are idle (or otherwise not in use or required to be turned on) to reduce power consumption and/or heat generation. When (e.g., each time) the device power control logic 147 modifies the power state of one of the devices 150, it may also indicate (e.g., via a signal) or otherwise cause the corresponding information to be updated in a storage device. In an embodiment, the device power control logic 147 may be coupled to a device memory range valid/invalid information storage device 152. The storage device 152 may store information about the power status information about various memory ranges associated with the devices 150 to indicate whether the memory ranges are valid (e.g., indicating a corresponding device is powered on) or invalid (e.g., indicating a corresponding device is powered off). In turn, in response to a request from the MMU 140 (e.g., indentified by a physical address as discussed above), the power fault control logic 145 may have access to the storage device 152 to determine based on the stored information whether a corresponding device memory or register file 152 may be accessed 170 (e.g., indicating the corresponding device is powered on) or alternatively (e.g., when the corresponding device is powered off) send one or more signals such as a power fault trap/interrupt 172 to the corresponding processor 102 or one of the cores 106.

Moreover, while FIG. 1 shows various components inside or outside of the processor 102-1, these components may be provided elsewhere in the system 100. For example, various components of the system 100 may be provided on a same integrated circuit die to form a System On Chip (SOC).

Figure 2:
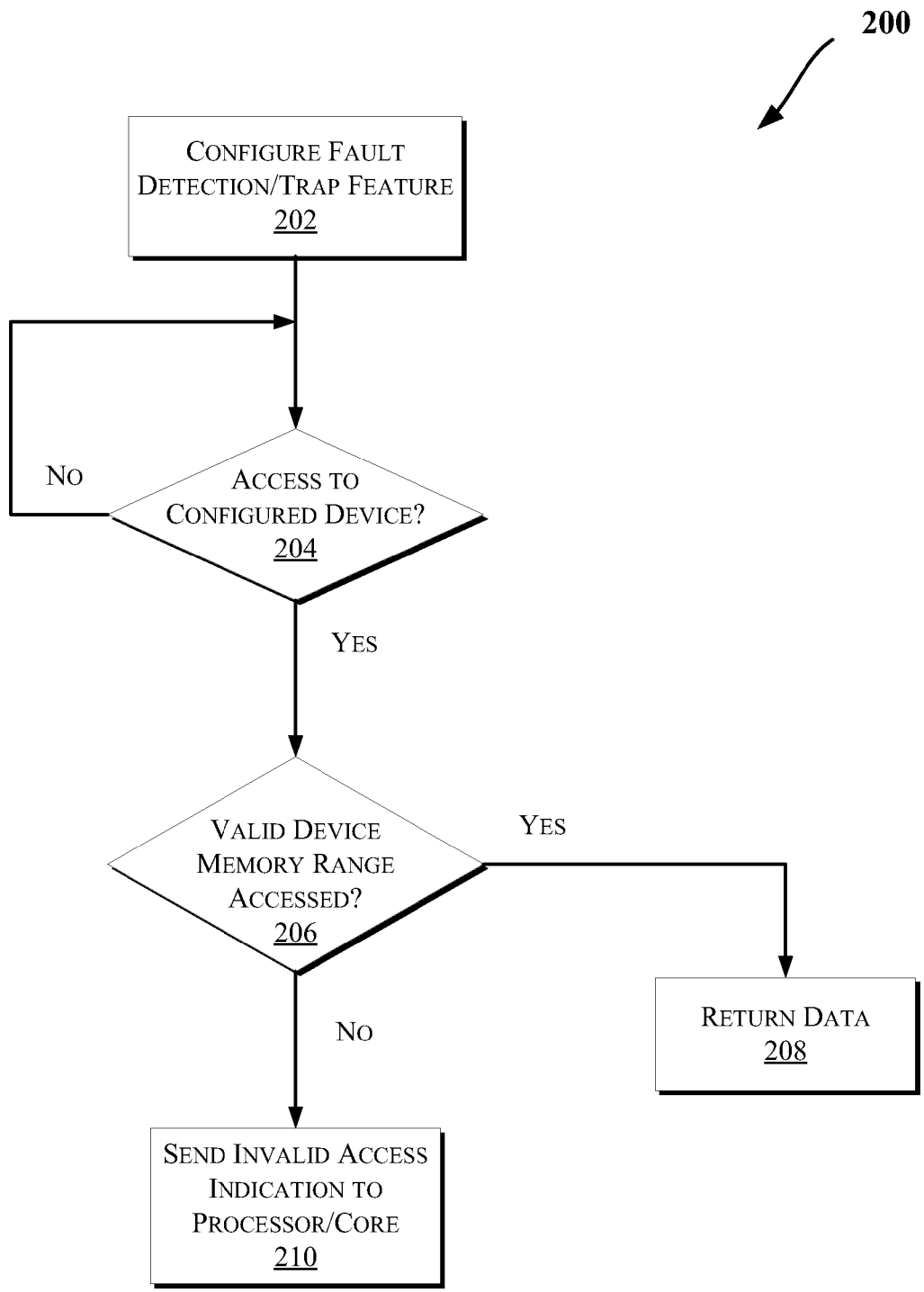
FIG. 2 illustrates a flow diagram of a method to control access to a device, according to an embodiment.

FIG. 2 illustrates a flow diagram of an embodiment of a method 200 to control access to a device, according to some embodiments. In an embodiment, various components discussed with reference to FIGS. 1 and 3-4 may be utilized to perform one or more of the operations discussed with reference to FIG. 2. It is understood that operation 202 may be performed dynamically at any time and not only once at method initiation.

Referring to FIGS. 1-2, at an operation 202, a fault detection/trap feature may be configured, e.g., by (e.g., OS, a user, etc.) setting or clearing a bit (e.g., in a register such as a control register) to enable/disable the power-fault trap/detection feature for a given device, all devices in a system, or select devices in a system (such as any of the devices 150). Other control bits may also be stored in the same storage device or register in various embodiments. At an operation 204, it may be determined (e.g., by the MMU 140) whether access has been requested (e.g., by one of the cores 106 or processor 102) to a configured device (e.g., one of devices 150).

If access to a configured device is detected at operation 204, it may be determined (e.g., by the logic 145 accessing the storage device 152) whether the access is to a valid device memory range (i.e., access to a device memory that is powered on per information stored in the storage device 152) at operation 206. If the access is to a valid device memory range at operation 206, the device memory (e.g., the device memory or register file 152) may be accessed 170 and the requested data returned to the requesting processor 102 or core 106 at an operation 208. Otherwise, if the access is to an invalid device memory range at operation 206, an invalid access indication 172 (e.g., one or more signals) may be sent (e.g., by the power fault control 145 per information stored in the storage device 152) to the requesting processor 102 or core 106 at an operation 210. The power fault trap/interrupt 172 in turn causes additional processing by the OS, driver, etc. to drop the access request, cause the device to be turned on (e.g., per an initiation signal sent to a PMM or device power control 147) with a resend of the trapped/interrupted access request, etc.

Figure 3:
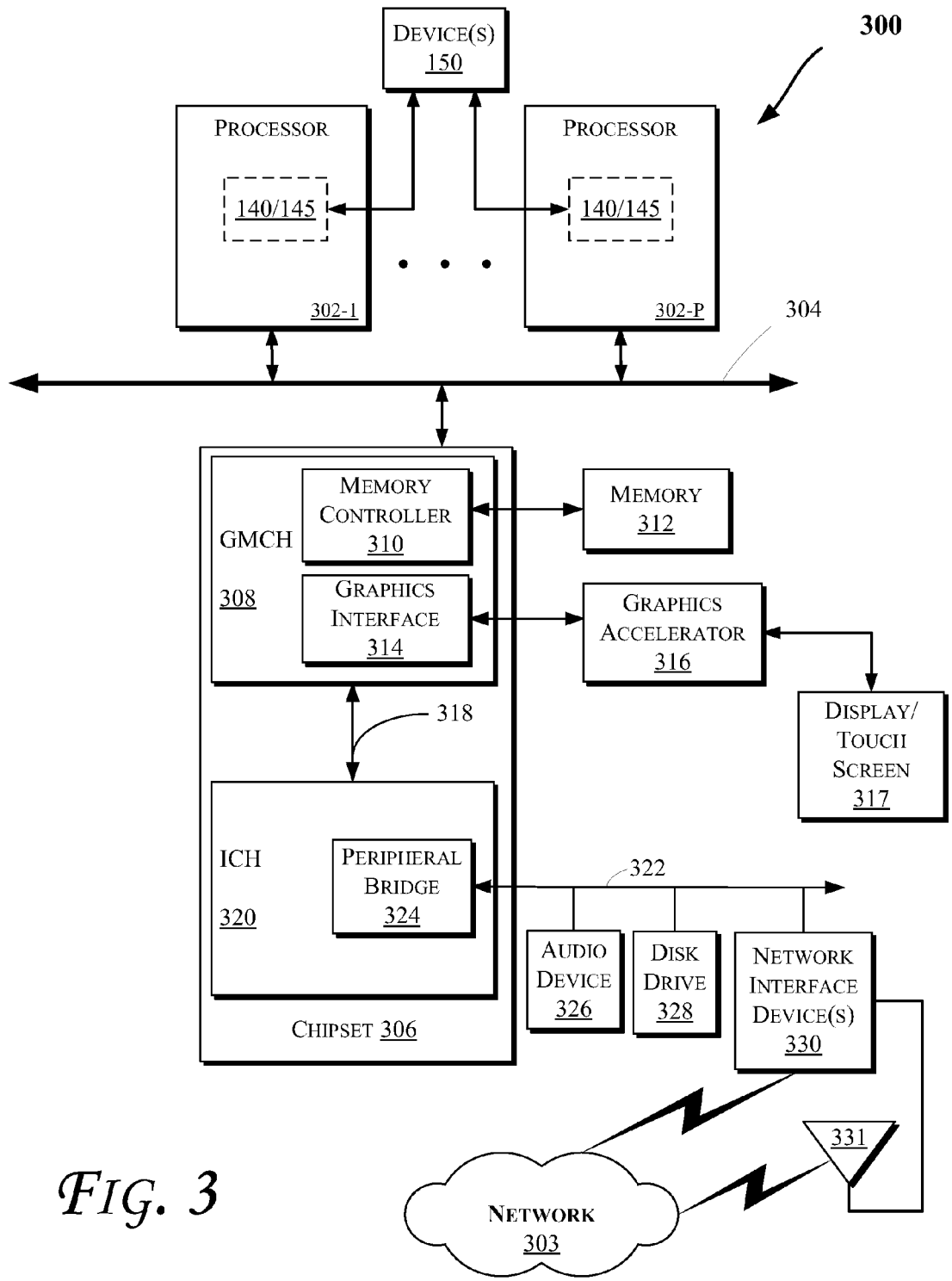

FIG. 3 illustrates a block diagram of a computing system 300 in accordance with an embodiment of the invention. The computing system 300 may include one or more central processing unit(s) (CPUs) or processors 302-1 through 302-P (which may be referred to herein as "processors 302" or "processor 302"). The processors 302 may communicate via an interconnection network (or bus) 304. The processors 302 may include a general purpose processor, a network processor (that processes data communicated over a computer network 303), an application processor (such as those used in cell phones, smart phones, etc.), or other types of a processor (including a reduced instruction set computer (RISC) processor or a complex instruction set computer (CISC)).

Various types of computer networks 303 may be utilized including wired (e.g., Ethernet, Gigabit, Fiber, etc.) or wireless networks (such as cellular, 3G (Third-Generation Cell-Phone Technology or 3rd Generation Wireless Format (UWCC)), 4G, Low Power Embedded (LPE), etc.). Moreover, the processors 302 may have a single or multiple core design. The processors 302 with a multiple core design may integrate different types of processor cores on the same integrated circuit (IC) die. Also, the processors 302 with a multiple core design may be implemented as symmetrical or asymmetrical multiprocessors.

In an embodiment, one or more of the processors 302 may be the same or similar to the processors 102 of FIG. 1. In some embodiments, one or more of the processors 302 may include one or more of the cores 106, logic 140, and/or logic 145 of FIG. 1. Also, system 300 may include various components of FIG. 1 including one or more of the device 152, logic 147, device(s) 150, memory/register file 152, etc. in various embodiments. Moreover, the operations discussed with reference to FIGS. 1-2 may be performed by one or more components of the system 300.

A chipset 306 may also communicate with the interconnection network 304. The chipset 306 may include a graphics and memory control hub (GMCH) 308. The GMCH 308 may include a memory controller 310 that communicates with a memory 312. The memory 312 may store data, including sequences of instructions that are executed by the processor 302, or any other device included in the computing system 300. In one embodiment of the invention, the memory 312 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 304, such as multiple CPUs and/or multiple system memories.

The GMCH 308 may also include a graphics interface 314 that communicates with a graphics accelerator 316. In one embodiment of the invention, the graphics interface 314 may communicate with the graphics accelerator 316 via an accelerated graphics port (AGP). In an embodiment of the invention, a display 317 (such as a flat panel display, a cathode ray tube (CRT), a projection screen, touch screen, etc.) may communicate with the graphics interface 314 through, for example, a signal converter that translates a digital representation of an image stored in a storage device such as video memory or system memory into display signals that are interpreted and displayed by the display 317. The display signals produced by the graphics interface and/or graphics accelerator may pass through various control devices before being interpreted by and subsequently displayed on the display 317.

A hub interface 318 may allow the GMCH 308 and an input/output control hub (ICH) 320 to communicate. The ICH 320 may provide an interface to I/O devices that communicate with the computing system 300. The ICH 320 may communicate with a bus 322 through a peripheral bridge (or controller) 324, such as a peripheral component interconnect (PCI) bridge, a universal serial bus (USB) controller, or other types of peripheral bridges or controllers. The bridge 324 may provide a data path between the processor 302 and peripheral devices. Other types of topologies may be utilized. Also, multiple buses may communicate with the ICH 320, e.g., through multiple bridges or controllers. Moreover, other peripherals in communication with the ICH 320 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 322 may communicate with an audio device 326, one or more disk drive(s) 328, and one or more network interface device(s) 330 (which is in communication with the computer network 303). As shown, the network interface device 330 may be coupled to an antenna 331 to wirelessly (e.g., via an Institute of Electrical and Electronics Engineers (IEEE) 802.11 interface (including IEEE 802.11a/b/g/n, etc.), cellular interface, 3G, 4G, LPE, etc.) communicate with the network 303. Other devices may communicate via the bus 322. Also, various components (such as the network interface device 330) may communicate with the GMCH 308 in some embodiments of the invention. In addition, the processor 302 and the GMCH 308 may be combined to form a single chip. Furthermore, the graphics accelerator 316 may be included within the GMCH 308 in other embodiments of the invention.

Furthermore, the computing system 300 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 328), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 300 may be arranged in a point-to-point (PtP) configuration. For example, processors, memory, and/or input/output devices may be interconnected by a number of point-to-point interfaces.

Figure 4:
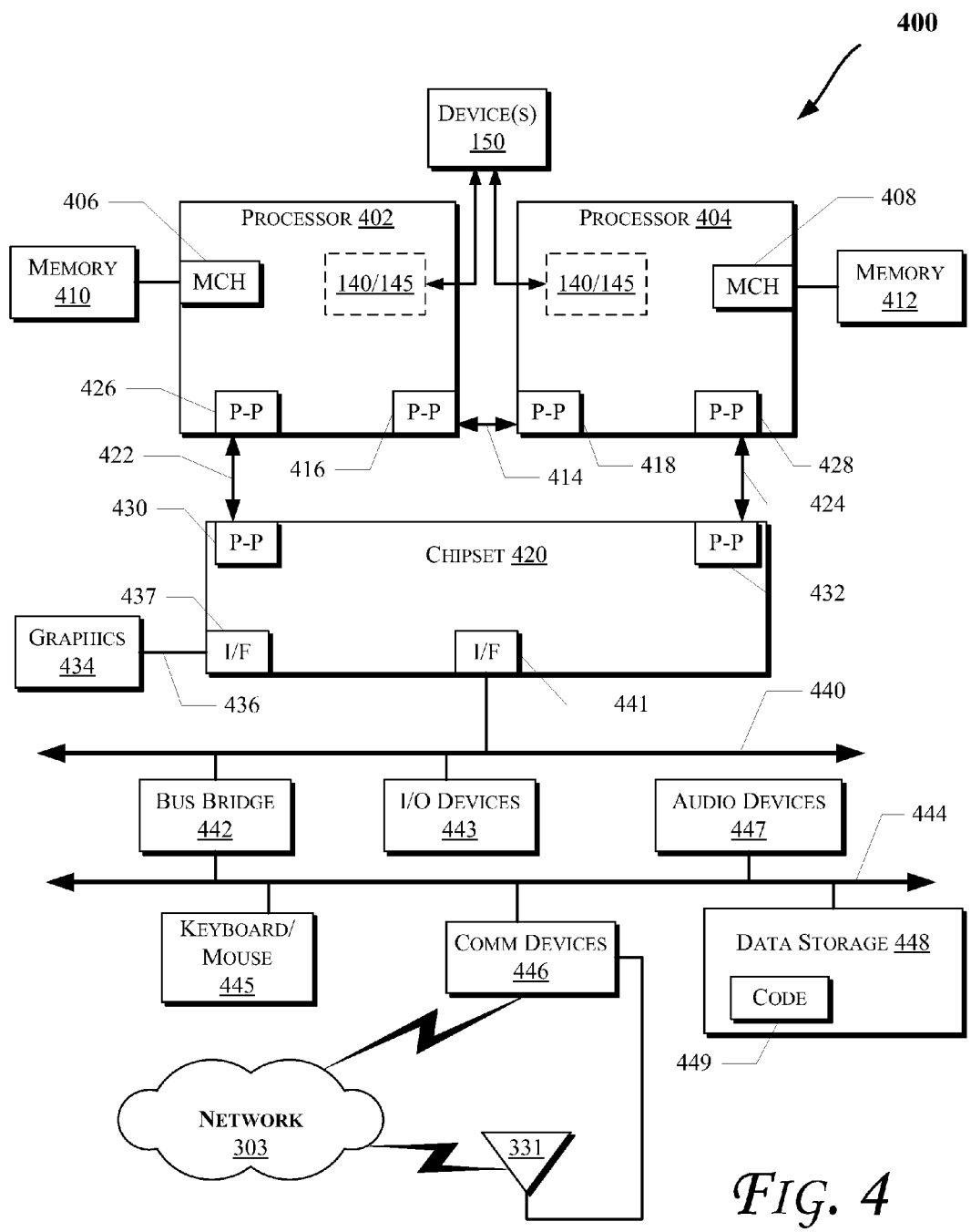

FIG. 4 illustrates a computing system 400 that is arranged in a point-to-point (PtP) configuration, according to an embodiment of the invention. In particular, FIG. 4 shows a system where processors, memory, and input/output devices are interconnected by a number of point-to-point interfaces. The operations discussed with reference to FIGS. 1-3 may be performed by one or more components of the system 400.

As illustrated in FIG. 4, the system 400 may include several processors, of which only two, processors 402 and 404 are shown for clarity. The processors 402 and 404 may each include a local memory controller hub (MCH) 406 and 408 to enable communication with memories 410 and 412. The memories 410 and/or 412 may store various data such as those discussed with reference to the memory 312 of FIG. 3. Also, the processors 402 and 404 may include one or more of the cores 106, logic 140, and/or logic 145 of FIG. 1. Also, system 400 may include various components of FIG. 1 including one or more of the device 152, logic 147, device(s) 150, memory/register file 152, etc. in various embodiments.

In an embodiment, the processors 402 and 404 may be one of the processors 302 discussed with reference to FIG. 3. The processors 402 and 404 may exchange data via a point-to-point (PtP) interface 414 using PtP interface circuits 416 and 418, respectively. Also, the processors 402 and 404 may each exchange data with a chipset 420 via individual PtP interfaces 422 and 424 using point-to-point interface circuits 426, 428, 430, and 432. The chipset 420 may further exchange data with a high-performance graphics circuit 434 via a high-performance graphics interface 436, e.g., using a PtP interface circuit 437.

In at least one embodiment, one or more operations discussed with reference to FIGS. 1-4 may be performed by the processors 402 or 404 and/or other components of the system 400 such as those communicating via a bus 440. Other embodiments of the invention, however, may exist in other circuits, logic units, or devices within the system 400 of FIG. 4. Furthermore, some embodiments of the invention may be distributed throughout several circuits, logic units, or devices illustrated in FIG. 4.

Chipset 420 may communicate with the bus 440 using a PtP interface circuit 441. The bus 440 may have one or more devices that communicate with it, such as a bus bridge 442 and I/O devices 443. Via a bus 444, the bus bridge 442 may communicate with other devices such as a keyboard/mouse 445, communication devices 446 (such as modems, network interface devices, or other communication devices that may communicate with the computer network 303, including via the antenna 331), audio I/O device, and/or a data storage device 448. The data storage device 448 may store code 449 that may be executed by the processors 402 and/or 404.

In various embodiments of the invention, the operations discussed herein, e.g., with reference to FIGS. 1-4, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-4.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   first logic to receive a data access request directed at a storage device corresponding to a device; and
   second logic to determine a power status of the device based at least in part on a memory address, corresponding to the data access request, received from the first logic,
   wherein access to the storage device is to be blocked in response to a determination by the second logic that the device is powered off based at least in part on the memory address,
   wherein the second logic is to transmit one or more signals to a processor or processor core that initiated the data access request in response to the determination by the second logic that the device is powered off based at least in part on the memory address, wherein the one or more signals are to comprise one or more processor interrupt signals to cause occurrence of one or more error-recovery operations.

2. The apparatus of claim 1, wherein the one or more signals are to indicate that access to the storage device is not allowed.

3. The apparatus of claim 1, wherein the processor or processor core is to cause the device to be powered on in response to the one or more signals.

4. The apparatus of claim 3, wherein the processor or processor core is to cause the device to be powered on prior to retransmission of the data access request.

5. The apparatus of claim 1, wherein the memory address is a physical memory address and wherein the first logic is to generate the physical memory address based on a virtual memory address transmitted by a processor or a processor core that initiated the data access request.

6. The apparatus of claim 1, wherein third logic is to control a supply of power to the device and wherein the third logic is to cause an update to information corresponding to the power status of the device when the power status of the device is modified by the third logic.

7. The apparatus of claim 1, wherein the second logic is to determine the power status of the device based on information stored in memory coupled between the second logic and third logic that is to control a supply of power to the device.

8. The apparatus of claim 1, wherein the second logic is to determine the power status of the device based on information stored in memory and wherein the stored information is to be modified when the power status of the device is modified by third logic that is to control a supply of power to the device.

9. The apparatus of claim 1, wherein the device comprises an input/output device.

10. The apparatus of claim 1, wherein the storage device is selected from a group comprising: a storage device on a same integrated circuit die as the device, a system memory, or a cache.

11. The apparatus of claim 1, wherein the storage device is to comprise a memory mapped input/output device or a port mapped input/output device.

12. The apparatus of claim 1, wherein the second logic is to determine the power status of the device in response to a determination that the device is configured to trap data accesses when the device is powered off.

13. The apparatus of claim 1, wherein a processor is to comprise one or more of the first logic, the second logic, and one or more processor cores.

14. The apparatus of claim 1, wherein the one or more processor interrupt signals are to be sent to an operating system or a driver to cause occurrence of the one or more error-recovery operations.

15. A method comprising:
receiving a data access request directed at a storage device corresponding to a device;
determining whether the device is configured to trap data access when the device is powered off;
determining a power status of the device based on a memory address, corresponding to the data access request; and
blocking access to the storage device in response to a determination that the device is powered off based at least in part on the memory address,
wherein one or more signals are transmitted to a processor or processor core that initiated the data access request in response to the determination that the device is powered off based at least in part on the memory address, wherein the one or more signals comprise one or more processor interrupt signals to cause occurrence of one or more error-recovery operations.

16. The method of claim 15, wherein determining the power status of the device based on the memory address, corresponding to the data access request, is performed in response to a determination that the device is configured to trap data accesses when the device is powered off.

17. The method of claim 15, wherein the one or more signals are to indicate that access to the storage device is not allowed.

18. The method of claim 15, further comprising the processor or processor core causing the device to be powered on in response to the one or more signals.

19. The method of claim 18, further comprising the processor or processor core causing the device to be powered on prior to retransmission of the data access request.

20. The method of claim 15, further comprising determining the power status of the device based on information stored in memory and modifying the stored information when the power status of the device is modified by logic that is to control a supply of power to the device.

21. The method of claim 15, further comprising transmitting the one or more processor interrupt signals to an operating system or a driver to cause occurrence of the one or more error-recovery operations.

22. A system comprising:
a processor having a plurality of processor cores;
memory to store information corresponding to a power status of a device;
first logic to receive a data access request directed at a storage device corresponding to a device; and
second logic to determine the power status of the device based on a memory address in the memory, corresponding to the data access request, received from the first logic,
wherein access to the storage device is to be blocked in response to a determination by the second logic that the device is powered off based at least in part on the memory address,
wherein the second logic is to transmit one or more signals to a processor or processor core that initiated the data access request in response to the determination by the second logic that the device is powered off based at least in part on the memory address, wherein the one or more signals are to comprise one or more processor interrupt signals to cause occurrence of one or more error-recovery operations.

23. The system of claim 22, wherein the processor or processor core is to cause the device to be powered on in response to the one or more signals.

24. The system of claim 23, wherein the processor or processor core is to cause the device to be powered on prior to retransmission of the data access request.

25. The system of claim 22, wherein the memory address is a physical memory address and wherein the first logic is to generate the physical memory address based on a virtual memory address transmitted by a processor or a processor core that initiated the data access request.

26. The system of claim 22, wherein third logic is to control a supply of power to the device and wherein the third logic is to cause an update to the information corresponding to the power status of the device when the power status of the device is modified by the third logic.

27. The system of claim 22, wherein the storage device is selected from a group comprising: a storage device on a same integrated circuit die as the device, a system memory, a cache, a memory mapped input/output device, or a port mapped input/output device.

28. The system of claim 22, wherein the second logic is to determine the power status of the device in response to a determination that the device is configured to trap data accesses when the device is powered off.

29. The system of claim 22, wherein the one or more processor interrupt signals are to be sent to an operating system or a driver to cause occurrence of the one or more error-recovery operations.

30. A non-transitory computer-readable medium comprising one or more instructions that when executed on at least one processor configure the at least one processor to perform one or more operations to:
receive a data access request directed at a storage device corresponding to a device;
determine whether the device is configured to trap data access when the device is powered off;
determine a power status of the device based on a memory address, corresponding to the data access request; and
block access to the storage device in response to a determination that the device is powered off based at least in part on the memory address,
wherein one or more signals are transmitted to a processor or processor core that initiated the data access request in response to the determination that the device is powered off based at least in part on the memory address, wherein the one or more signals comprise one or more processor interrupt signals to cause occurrence of one or more error-recovery operations.

31. The non-transitory computer-readable medium of claim 30, further comprising one or more instructions that when executed on the at least one processor configure the at least one processor to perform one or more operations to determine the power status of the device based on the memory address, corresponding to the data access request, in response to a determination that the device is configured to trap data accesses when the device is powered off.

32. The non-transitory computer-readable medium of claim 30, further comprising one or more instructions that when executed on the at least one processor configure the at least one processor to perform one or more operations to cause the device to be powered on in response to the one or more signals.

33. The non-transitory computer-readable medium of claim 32, further comprising one or more instructions that when executed on the at least one processor configure the at least one processor to perform one or more operations to cause the device to be powered on prior to retransmission of the data access request.

34. The non-transitory computer-readable medium of claim 30, further comprising one or more instructions that when executed on the at least one processor configure the at least one processor to perform one or more operations to determine the power status of the device based on information stored in memory and modify the stored information when the power status of the device is modified by logic that is to control a supply of power to the device.

35. The non-transitory computer-readable medium of claim 30, further comprising one or more instructions that when executed on the at least one processor configure the at least one processor to perform one or more operations to transmit the one or more processor interrupt signals to an operating system or a driver to cause occurrence of the one or more error-recovery operations.

* * * * *